US006704679B1

United States Patent
Coni et al.

(10) Patent No.: US 6,704,679 B1
(45) Date of Patent: Mar. 9, 2004

(54) DEVICE FOR ACQUISITION OF LOGIC STATES FROM MULTIPLE SENSORS

(75) Inventors: Philippe Coni, St Jean d'Illac (FR); Michel Martinez, Martignas S/Jalle (FR); Philippe Besnier, Parempuyre (FR); Pascal Moreau, Gradignan (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/868,030

(22) PCT Filed: Dec. 15, 1999

(86) PCT No.: PCT/FR99/03148
§ 371 (c)(1),
(2), (4) Date: Jun. 14, 2001

(87) PCT Pub. No.: WO00/37893
PCT Pub. Date: Jun. 29, 2000

(30) Foreign Application Priority Data

Dec. 18, 1998 (FR) .............................. 98 16023

(51) Int. Cl.[7] .................................... G06F 15/00
(52) U.S. Cl. ........................................ 702/127
(58) Field of Search ................. 702/127, 144, 702/182, 64, 104, 107, 85

(56) References Cited

U.S. PATENT DOCUMENTS 5,801,682 A  9/1998 Coni et al. .............. 345/174
6,404,353 B1 * 6/2002 Coni et al. ................ 341/33

FOREIGN PATENT DOCUMENTS

| DE | 31 28 811 | * | 2/1983 |
| DE | 279 090 | * | 5/1990 |
| EP | 572 204 | * | 12/1993 |

* cited by examiner

Primary Examiner—Michael Nghiem
(74) Attorney, Agent, or Firm—Oblon, Spivak, McClelland, Maier & Neustadt, P.C.

(57) ABSTRACT

A system for acquisition of logic states including sensors operable in all-or-nothing mode, each sensor including a switch linked with a pulling resistor between ground and power-supply potential, an analog multiplexer including an output and inputs linking the switches and resistors, voltage representative of the potential linked to a specific input, an analog-digital converter linked to the output, a calculating logic unit which drives the multiplexer and converter, generates input addresses of the multiplexer periodically and sequentially, reads and stores digital values at an output of the converter for each address, determines a digital value of the voltage, determines for each address corresponding to a sensor, a position of the digital value for an address with respect to a threshold, relating to an address, the position representing logic state of each sensor, and an altering device for altering the threshold as a function of the digital value of the voltage.

13 Claims, 1 Drawing Sheet

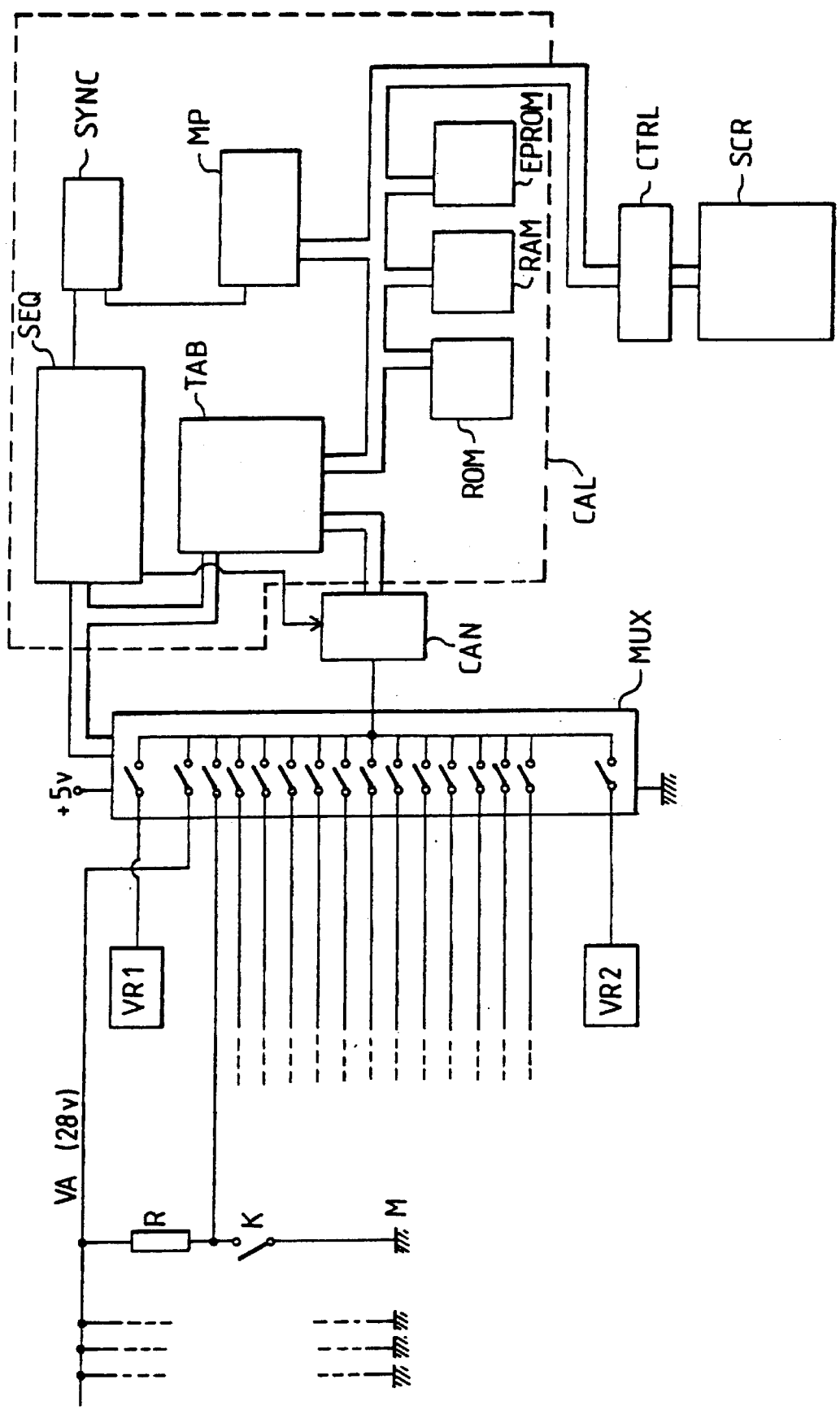

DEVICE FOR ACQUISITION OF LOGIC STATES FROM MULTIPLE SENSORS

BACKGROUND OF THE INVENTION

1. Field of the Invention

The invention relates to a device for acquisition of logic states from multiple sensors operating in all-or-nothing mode.

2. Discussion of the Background

The principal, but not exclusive, application of the invention is the detection of malfunctions in all parts of an aircraft and the indication of these malfunctions at a place which is visible to the pilot of the aircraft.

Conventionally, the practice was to link a sensor operating in all-or-nothing mode, that is to say an electrical switch, in practice, to a pilot light the color of which, for example red, orange or green, represented the level of seriousness of the malfunction.

With the growth in the complexity of operation of aircraft, it is becoming necessary to arrange several tens of alarm lamps, and it is desired to replace all these lamps by a single visual-display console displaying, on a screen, an indication as to the nature of the malfunction only when a malfunction is observed. The color of the display again corresponds to the level of seriousness of the malfunction.

It is desirable for this console to be usable in all types of aircraft, and it should therefore be able to be adapted to different numbers and different types of malfunction sensors.

With the sensors being switches (door-opening detector, detector of position of movable members; etc), a conventional solution then consists in establishing a logic signal representing the open or closed state of each switch and in transmitting this logic state to one of the multiple inputs of a multiplexer. This multiplexer is addressed sequentially and sends, to its output, at a given instant, the open or closed logic state of the switch which is addressed at that instant. The information at the output of the multiplexer is managed by a controller in order to display indications in the event of a malfunction being detected by a sensor.

If a switch is open, the logic state at the output of the multiplexer will, for example, be the zero state; if it is closed, it will be the "1" state (the inverse is also possible). The switch is generally open at rest, closed in the event of a malfunction being detected (for reasons of reduction in the consumption at rest). The multiplexer consists of addressable logic gates arranged between the inputs and the output.

This requires the switch to be linked, upstream of the logic multiplexer, between two voltage levels, via a pulling resistor, in such a way that the potential of the junction point between the switch and the resistor changes from one potential level to the other depending on whether the switch is open or closed. One of the potential levels corresponds to a logic high state, the other to a logic low state. The pulling resistor may be a pull-up resistor or pull-down resistor.

The junction point of the switch and of its pulling resistor is linked to a threshold-type comparator which switches over in one direction or the other depending on whether the switch is open or closed, and the output of the comparator is linked to one input of the multiplexer.

One of the difficulties in implementation stems from the lack of reliability of detection of the open or closed state of the switch upstream of the multiplexer. This is because this detection depends:

on the value of the pulling resistor, on the intrinsic resistance of the contact of the switch, on the power-supply potential of the combination of the switch plus pulling resistor, on the variations in these values with temperature, etc.

Typically, in an aircraft or a helicopter, it is possible to use the general electrical earth of the aircraft as low-potential level and the general DC electrical power supply of the aircraft, for example at 28 volts, as high-potential level.

However, this power supply is not stable. It varies over time, it is subject to overvoltages, to microbreaks, to standby batteries being or not being put into service, etc.

The schedules of specifications dictate, for example, that, for a nominal value of 28 volts, the apparatus operates correctly even if the voltage falls to 16 volts or rises to 36 volts.

The pulling resistor depends on the type of sensor: some require a fairly low resistance, for example because the sensor is in series with a local pilot light; others use a higher resistance in order to limit the power consumption.

The contact resistance of the switch varies with its aging: dirtying of the contacts, wear. However, the potential applied to the input of the threshold-type comparator, in the closed state of the switch, depends on the ratio between the resistance value of the switch proper and the value of the pulling resistor.

For these reasons, and for yet more, it is not easy to set the threshold or thresholds of the comparators individually so as to be certain that the logic state transmitted by the comparator will correspond to an open or closed state of the switch.

Moreover, it would be desirable to have not just information on the open or closed state of the switch, but also information on the fact that this information is not reliable and should not be taken into account (for example because of the aging of a sensor: failure information, implying the need for replacement, would be desirable). The same would be true, moreover, of information on a circuit fault (fault in a comparator, multiplexer, connection, etc.) between the sensor and the visual-display screen controller.

Furthermore, it is desirable to have the most flexible and the most universal acquisition system possible, allowing for numerous configurations for detection of malfunctions by simple programming of parameters internal to the system, with a minimum number of modifications to electronic cards in order to change from one application to another.

Finally, clearly, the constraints of cost, of bulk and of weight are an important element to be taken into consideration, as well as the possibilities for frequent testing of the system, above all for aeronautical applications.

SUMMARY OF INVENTION

Hence the invention proposes a system for acquisition of logic states from multiple sensors operating in all-or-nothing mode, in which each sensor consists of a switch linked in series with a pulling resistor between earth and a power-supply potential, this system being characterized in that the junction point of a sensor and of the corresponding resistor is linked to a corresponding input of an analog multiplexer, a voltage representative of the power-supply potential also being linked to a specific input of the multiplexer, the output of the multiplexer being linked to an analog-digital converter, the multiplexer and the converter being driven by a calculating logic unit which periodically and sequentially generates all the input addresses of the multiplexer, reads and stores the corresponding digital values at the output of the converter for each address, determines a digital value of power-supply voltage, determines, for each address corresponding to a sensor, the position of the digital value read for this address with respect to at least one respective threshold value relating to this address, this position representing the logic state of the sensor, means being provided for altering the threshold value as a function of the digital value determined for the power-supply voltage.

It may be wished to detect not only the open or closed state of the sensor but also a range of uncertainty for which the state has to be regarded as indeterminate (sign of failure of the sensor or of a part of the link for detecting the state of the sensor). In this case, the position of the digital value corresponding to the address of a sensor is compared with two thresholds, the indeterminate state corresponding to a value lying between the two thresholds. Each of these thresholds can be altered as a function of the digital value attributed to the power-supply voltage by the system.

If the acquisition system is used to display malfunctions on a visual-display screen, no indication will be displayed if the switch is in rest position (open state, in general), specific alarm information for the sensor concerned will be displayed in the event of the inverse state (switch closed), and fault information in the case of an uncertain state.

The threshold values for a given sensor and for a normal power-supply voltage value are preferably stored in a programmable memory of the logic unit.

The threshold values used in the comparison are calculated for each sensor as a function of the current digital value determined by the system for the power-supply voltage to the sensors (in general one voltage for all the sensors, but, if there are several power-supply voltages, each voltage will be applied to a respective input of the analog multiplexer in order to be measured).

The variation in the threshold voltages as a function of the power-supply voltage may follow any law, programmed within the logic unit, but in general a proportional variation will be sufficient.

The digital value of power-supply voltage used to alter the thresholds will preferably be a filtered value rather than the instantaneous value read in the course of a sequence of reading and analysis of the analog voltages output by the sensors. This makes it possible to avoid disturbances (and thus false alarms, for example) due to microbreaks in power supply or to insignificant, very brief, stray overvoltages.

In practice, the calculating logic unit comprises a sequencer driving, in synchronism, the addressing of the multiplexer, the analog-digital converter, and a memory for storing the values supplied by the converter, and a programmed microcontroller capable of addressing the storage memory in order to extract from it the information stored by the sequencer, to process this information, and to supply information resulting from this processing and representing the state of each of the sensors.

BRIEF DESCRIPTION OF THE DRAWINGS

Other characteristics and advantages of the invention will emerge on reading the detailed description which follows and which is given by reference to the attached drawings, in which the single FIGURE represents the general principle of the acquisition system according to the invention.

DESCRIPTION OF EMBODIMENTS

The invention will be described in the case of a system for displaying malfunctions of a complex installation (aircraft, ship, electricity power station, factory, etc.), in which numerous sensors operating in all-or-nothing mode are distributed at the places requiring monitoring and are linked to central measuring and display equipment.

The invention is also applicable, however, when the state of the sensors is intended to be used directly without being displayed (used to trigger action to correct a malfunction, for example).

By way of example, the sensors operating in all-or-nothing mode are door-opening detectors, end-of-travel switches, float contacts, etc.

The sensors operating in all-or-nothing mode are each linked to a respective input of an analog multiplexer MUX. By analog multiplexer is meant a multiplexer which, when one of its inputs is selected, transmits to its output the analog-voltage level present on that input. A single sensor K is represented in FIG. 1 in order to simplify the representation. The multiplexer MUX is represented in terms of a single sixteen-input stage, but it may have more than sixteen inputs and it may be organized into several stages in cascade, the outputs of several multiplexers of one stage being linked to the inputs of a multiplexer of a following stage.

The sensors are each connected in series with a respective pulling resistor R, the series assembly being linked between a general electrical earth M (in principle the same one for all the sensors) and a general DC power-supply potential VA. In the case of an aircraft or helicopter, for example, the 28-volt DC power-supply cable which serves the various parts of the aircraft or the helicopter can be used as power-supply potential.

The resistor R is called pulling resistor since, when the switch K is open, it pulls the junction point of the switch and of the resistor toward the potential to which it is otherwise connected.

If the pulling resistor is connected to the power-supply potential VA, assumed to be positive, it is a pull-up resistor; if it is connected to earth M, it is a pull-down resistor.

The switch K is preferably open at rest, closed in the case of a malfunction, but it will be understood that the reverse is also possible.

The power-supply potential VA is linked to a specific input of the analog multiplexer in such a way that it will be possible to transmit this potential to the output of the multiplexer with a view to measuring it. If there are several different power-supply potentials for different groups of sensors, a specific input will be provided for each of these potentials. If so desired, it will be possible to apply, to the input of the multiplexer, rather than the power-supply voltage VA itself, a voltage representative of VA, such as a fraction of this voltage obtained by way of a divider bridge.

The other inputs of the multiplexer are each linked to a respective sensor, that is to say, more precisely, to the junction point of the switch and of the pulling resistor corresponding to this sensor. The pulling resistors may also be localized at the site of a sensor or be grouped together in the central equipment which processes the information coming from the sensors and which displays the alarms.

However, for reasons which will be explained later on, provision can be made for two inputs of the multiplexer to be reserved in order for each to receive a reference potential VR1 and VR2, which are precise and independent of the variations in the power-supply voltage, in the temperature, etc.

The potential VR1 is a low potential capable of representing one end of an analog-digital conversion range; the potential VR2 is a high potential representing another end of this range.

The output of the multiplexer MUX is linked to the input of an analog-digital converter CAN, actuated in synchronism with the multiplexer in order periodically to supply a series of digital values corresponding to the analog voltages present on each of the inputs of the multiplexer. The input addresses of the multiplexer, each corresponding to a respective sensor K or to one of the voltages VA, VR1, VR2, are thus scanned successively and the scanning is renewed periodically. The periodicity may, for example, be of 30 milliseconds. A controlled-gain amplifier can be inserted between the output of the multiplexer and the input of the converter.

Multiplexer and converter are driven by a programmable calculating logic unit, the function of which is to obtain information on the state of each of the sensors on the basis of the digital values supplied by the converter and on the basis of other digital values (of the threshold values) recorded in a programmable memory. The calculating logic unit can be programmable not only to store desired threshold values, but also, in certain cases, to determine the calculations to be done.

The block diagram of the calculating logic unit, that is to say of the circuits for processing the digital information output by the analog-digital converter CAN, can be seen on the right-hand part of the figure, in the dashed square referenced CAL.

The calculating logic unit may consist of two main parts:
  a conversion sequencer proper, SEQ, which controls the multiplexer MUX and the converter CAN, and which stores, in a volatile digital memory (registers) TAB, all the digital values of analog voltages present on the inputs of the multiplexer, each at an address which corresponds to an input address of the multiplexer, and thus at a corresponding sensor address (or, in the case of the multiplexer inputs which are not linked to a sensor, an address corresponding to one of the power-supply voltages VA, VR1 or VR2);
  and a microcontroller, that is to say a microprocessor MP with its volatile working memories (RAM), its programmable, non-volatile data memories (EPROM) and its read-only program memories (ROM or EPROM); this microcontroller uses the memory TAB filled by the sequencer as a peripheral, and it is consequently capable of reading and then processing the digital values stored in this memory TAB.

A common synchronization circuit SYNC controls the microprocessor and the sequencer SEQ in order to make them work in correspondence with one another.

The microprocessor MP also has, as peripheral unit, a visual-display screen controller (CTRL) which drives the displaying of the desired information on a screen SCR. The desired information may be detailed information on the sensors or else, in the aeronautical application envisaged here, only information on the state of the sensors which represent a detected malfunction (alarm or fault).

The operation of the system is as follows.

Each sensor K supplies the input of the multiplexer with an analog voltage depending on the open or closed state of the sensor; and, in the closed state, this voltage depends on the value of the pulling resistor, on the power-supply voltage, on the more or less defective state of the contact of the switch, and on the more or less defective state of the line which links it to the multiplexer.

In the course of a sequence of scanning of all the input addresses of the multiplexer, the sequencer SEQ stores, in the memory TAB which is associated with it, all the digital values representing the input analog voltages of the multiplexer, including those which represent the power-supply potentials VA and the reference potential VR1 and VR2.

While the sequencer is commencing a second scanning and storage sequence, the microcontroller a processes the digital values stored in the course of the first sequence. The memory TAB is therefore organized in such a way as to operate in "double page" mode: one page reserved for recording while the other is reserved for reading, the functions of the pages being reversed at each new sequence.

The digital values corresponding to the low VR1 and high VR2 reference potentials are compared with theoretical values and, if there is a discrepancy, this discrepancy represents a conversion error. This error is then used to correct all the digital values stored by the analog-digital converter. The correction is, for example, a function of linear interpolation between the error on the low value VR1 and the error on the high value VR2. The correction programs are stored in the read-only memories of the microcontroller.

The digital value corresponding to the power-supply voltage VA, corrected if appropriate for the conversion error, is processed by filtering (essentially anti-aliasing filtering), as a function of the values measured in the preceding sequences, in order to smooth the variations in VA and to eliminate the rogue values which are due to stray overvoltages or microbreaks. The digital value thus filtered is stored at a specific address of the working memory of the microcontroller, and it then serves as a value representative of the voltage VA for the processing of the digitized voltage values coming from the sensors in the course of the sequence being analyzed.

More precisely, the digital value of VA is used to calculate new threshold values (high threshold and low threshold) corresponding to each sensor, from a table of theoretical threshold values recorded (for a given application) in a non-volatile memory (preferably in a reprogrammable EPROM memory).

The recalculated threshold values are stored by the microcontroller in its working memory. They will serve for the analysis sequence in progress and will be altered, if necessary, in the following sequences.

The altered threshold calculation is done according to a calculating program recorded in the read-only program memory of the microcontroller. The simplest solution consists in making the thresholds proportional to the power-supply voltage VA, that is to say in multiplying the nominal threshold voltage recorded by the ratio between the value of power-supply voltage determined above and the nominal value of this power-supply voltage. Other, more sophisticated, calculating rules (linear variations, logarithmic variations, etc.) would be possible, needless to say.

The microcontroller compares each digital input value, corresponding to a given sensor address, with the high threshold and with the low threshold recalculated for this address.

Depending on whether the value is below the low threshold, above the high threshold, or between the two thresholds, it then supplies an indication corresponding to a closed state (assuming that the switch is connected to earth with a pull-up resistor as in FIG. 1), an open state, or an indeterminate state representing a failure of the sensor or of the acquisition system.

This information, for each sensor, is raw information, supplied as such at the output of the microcontroller. In the case of a fault-display system, the control program (that of the microcontroller or, as appropriate, that of a microprocessor of higher level which would receive the raw information from the microcontroller) displays an explicit indication for the user on the screen SCR.

The program may provide for any more sophisticated sort of processing of the information received: memory storage and continuous display of all the detections corresponding to alarms and to faults, deletion of this display by manual action by the user, display of information correlating the indications from several sensors, etc. This, needless to say, depends on the applications envisaged.

The invention has been described by assuming that the switches operating in all-or-nothing mode are mechanical contactors. It will be understood that it can easily be transposed to the case where the sensors are photoelectric cells also operating in all-or-nothing mode.

What is claimed is:

1. A system for acquisition of logic states comprising:

a plurality of sensors operable in an all-or-nothing mode, each of the plurality of sensors including a switch linked in series with a pulling resistor between ground and a power-supply potential;

an analog multiplexer including an output and a plurality of inputs each connected to a respective junction point of a switch and of a pulling resistor, a voltage representative of the power-supply potential also being linked to a specific input thereof;

an analog-digital converter linked to the output of the analog multiplexer;

a calculating logic unit which drives the analog multiplexer and the analog-digital converter, generates all input addresses of the analog multiplexer periodically and sequentially, reads and stores corresponding digital values at an output of the analog-digital converter for each of the input addresses, determines a digital value of the power-supply voltage, determines for each respective input address corresponding to a respective one of the plurality of sensors, a position of the digital value read for said respective input address with respect to at least one respective threshold value, relating to the respective input address, the position representing a logic state of said respective one of the plurality of sensors; and altering means for altering the at least one threshold value as a function of the digital value of the power supply voltage, the altering means being provided in the calculating logic unit.

2. A system according to claim 1, wherein the position of the digital value read for the respective input address is determined with respect to a low threshold value and a high threshold value in order to supply an indication of a closed state, open state, and indeterminate state of each of the plurality of sensors.

3. A system according to claim 1, wherein the at least one threshold value is calculated using a proportional calculation on a basis of a nominal threshold value recorded for a given sensor and of a ratio between a value determined for the power-supply potential and a nominal value of the power-supply potential.

4. A system according to claim 1, wherein the digital value of the power-supply voltage is determined by filtering on a basis of an instantaneous digital value read in a course of a sequence of scanning the analog multiplexer and of previously determined values, in order to smooth variations in the power-supply potential and to eliminate rogue values.

5. A system according to claim 1, wherein a low reference potential and a high reference potential are each applied to a respective input of the analog multiplexer, the calculating logic unit determines a conversion error by comparing each of the digital values at the output of the analog-digital converter corresponding to each of the potentials with each of theoretical values corresponding to each of the potentials, and the calculating logic unit, on a basis of the conversion error, calculates a correction to be applied to the digital values supplied by the analog-digital converter before determining the position of each of the digital values of the plurality of sensors with respect to the at least one threshold value.

6. A system according to claim 1, wherein the calculating logic unit comprises a sequencer driving, in synchronism, an addressing of the analog multiplexer, the analog-digital converter, a storage memory for storing the digital values supplied by the analog-digital converter and a programmed microcontroller configured to address the storage memory in order to extract from the storage memory information stored by the sequencer with a view to process the information, and supply the information resulting from processing and representing the logic state of each of the plurality of sensors.

7. A system for acquisition of logic states comprising:

a plurality of sensors operable in an all-or-nothing mode, each of the plurality of sensors being positioned between ground and a power-supply potential;

an analog multiplexer having an output and a plurality of inputs linked to the plurality of sensors, respectively, a voltage representative of the power-supply potential also being linked to a specific input thereof;

an analog-digital converter having an input linked to the output of the analog multiplexer; and a calculating logic unit which drives the analog multiplexer and the analog-digital converter, generates all input addresses of the analog multiplexer periodically and sequentially, reads and stores digital values at an output of the analog-digital converter for each of the input addresses, determines a digital value of the power-supply voltage, determines for the input addresses corresponding to the plurality of sensors, respectively, positions of each of the digital values read for each of the input addresses respectively, with respect to at least one respective threshold value relating to each of the input addresses, the positions representing logic states of the plurality of sensors, said calculating logic unit comprising altering means for altering the at least one threshold value as a function of the digital value of the power supply voltage.

8. A system according to claim 7, wherein each of the plurality of sensors includes a photoelectric cell.

9. A system according to claim 7, wherein the position of the digital value read for the respective input address is determined with respect to a low threshold value and a high threshold value in order to supply an indication of a closed state, open state, and indeterminate state of each of the plurality of sensors.

10. A system according to claim 7, wherein the at least one threshold value is calculated using a proportional calculation on a basis of a nominal threshold value recorded for a given sensor of the plurality of sensors and of a ratio between a value determined for the power-supply potential and a nominal value of the power-supply potential.

11. A system according to claim 7, wherein the digital value of the power-supply potential is determined by filtering on a basis of an instantaneous digital value read in a course of a sequence of scanning the analog multiplexer and of previously determined values, in order to smooth variations in the power-supply potential and to eliminate rogue values.

12. A system according to claim 7, wherein a low reference potential and a high reference potential are each applied to a respective input of the analog multiplexer, the calculating logic unit determines a conversion error by comparing each of the digital values at the output of the analog-digital converter corresponding to each of the potentials with each of theoretical values corresponding to each of the potentials, and the calculating logic unit, on a basis of the conversion error, calculates a correction to be applied to the digital values supplied by the analog-digital converter before determining the position of each of the digital values of the plurality of sensors with respect to the at least one threshold value.

13. A system according to claim 7, wherein the calculating logic unit comprises a sequencer driving, in synchronism, an addressing of the analog multiplexer, the analog-digital converter, a storage memory for storing the digital values supplied by the analog-digital converter, and a programmed microcontroller configured to address the storage memory in order to extract from the storage memory information stored by the sequencer a view to process the information, and supply the information resulting from processing and representing the logic state of each of the plurality of sensors.

* * * * *